No. 741,903. PATENTED OCT. 20, 1903.
E. GATES.
EDUCATIONAL TOY OR GAME APPARATUS.
APPLICATION FILED JAN. 16, 1903.
NO MODEL.
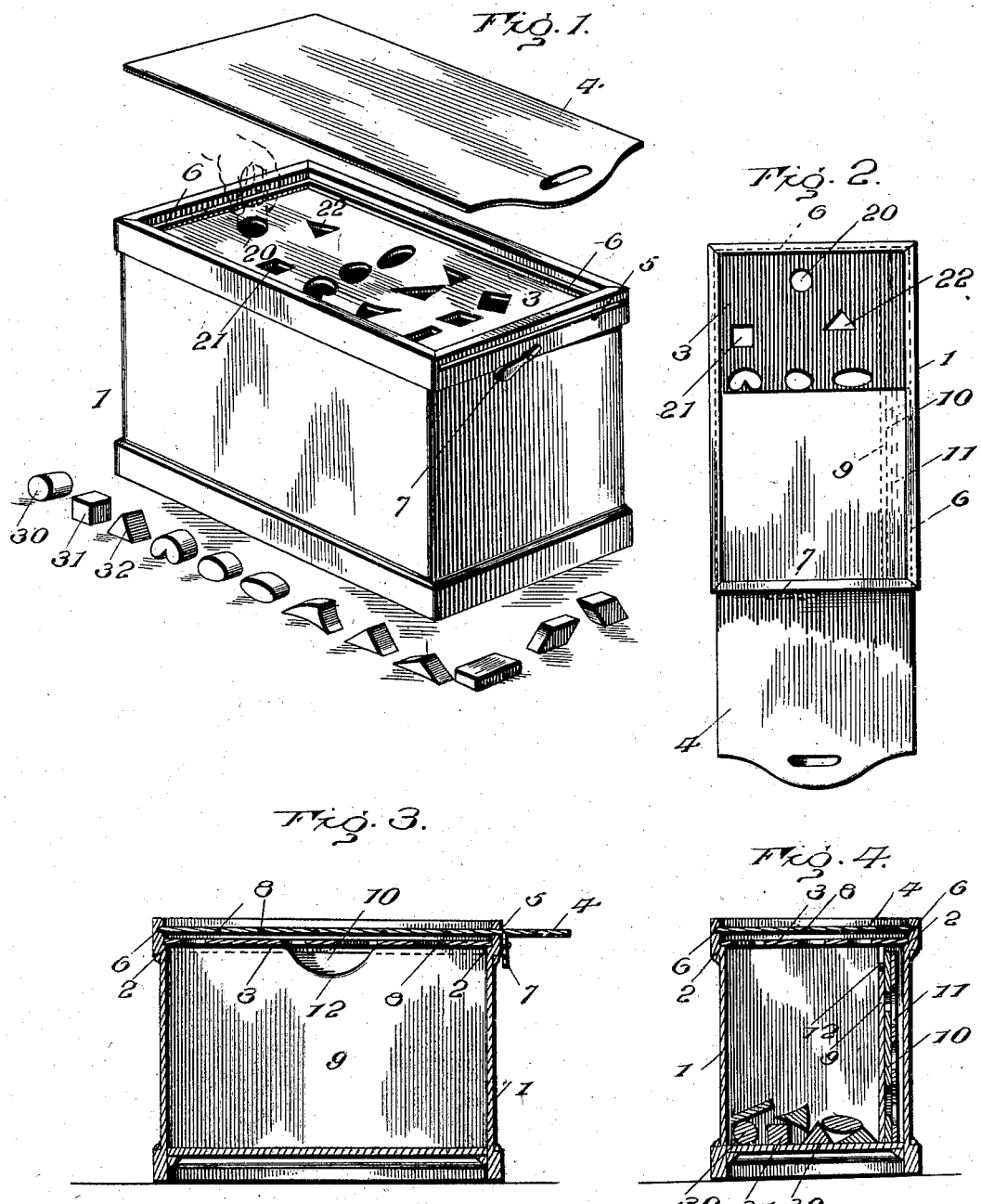

No. 741,903. Patented October 20, 1903.

UNITED STATES PATENT OFFICE.

ELMER GATES, OF CHEVY CHASE, MARYLAND.

EDUCATIONAL TOY OR GAME APPARATUS.

SPECIFICATION forming part of Letters Patent No. 741,903, dated October 20, 1903.

Application filed January 16, 1903. Serial No. 139,289. (No model.)

*To all whom it may concern:*

Be it known that I, ELMER GATES, a resident of Chevy Chase, Maryland, have invented a new and useful Improved Educational Toy or Game Apparatus, which invention is fully set forth in the following specification.

The principal object of my invention is to apply to the infantile mind the principles of the art of mentation in connection with calling into dominant activity the play and imitative instinct of children. To that end the invention provides a fascinating toy or game apparatus by the use of which the imaging, conceptional, and ideative functions may be so regulated and directed as to cause the young mind to consciously discriminate between different-shaped objects, preferably geometrical images, such discrimination being manifested by a voluntary act, and the proper kind of motor-memories (meaning by the term "motor-memory" a memory of a voluntary act of motion) being thus enregistered in the brain. A child naturally delights in sticking coins, blocks, or other small objects into a crack or opening (not excepting its own mouth) and is able to do this long before it is old enough to speak. At this same age the child is fully old enough to stick round blocks into round holes and square blocks into square holes, and so on, and may thus learn to readily distinguish between geometrical images. The play impulse may thus be utilized at the period of its greatest activity and when the young mind is most susceptible to the enregistration of a series of mathematical memories of the first order. It is at this precise period when the natural activity of the mental faculty first begins to develop that it can be trained to arouse all of its functioning and to develop whatever genius there is latent in the mind. If the training is not done at this time, subsequent training develops only talent and not genius. Classific mind development is not produced by simply giving a child blocks of different shapes and sizes to play with. The child must be caused to consciously discriminate between the various shapes and sizes and to base some voluntary action upon that discrimination, so as to associate it with a motor-memory. If this conscious experience of discriminating between the blocks has been several times repeated in connection with some act based on that discrimination, the memory enregistration will be vivid and permanent.

The invention consists of a plate or board made of any suitable material having therethrough a number of holes of different shapes and a number of differently-shaped blocks adapted to closely fit and pass through the holes. In the preferred form of the invention the plate or board constitutes part of a box, preferably its top, lid, or cover, and, furthermore, the holes through the plate and the blocks (of which there may be more than one for each hole) have geometrical shapes and are so regulated as to size that each block will pass only through a single opening of exactly corresponding geometrical shape and will not pass through any other opening.

The invention embraces other features of construction and will be best understood in its entirety by reference to the accompanying drawings, illustrating one of the many mechanical expressions of which it is susceptible.

In said drawings, Figure 1 is a perspective view. Fig. 2 is a plan view, the outer imperforate cover being partly withdrawn to expose only a few of the openings in the under lid or plate. Fig. 3 is a longitudinal sectional view through the box, and Fig. 4 is a transverse sectional view.

1 is a box having an interior shoulder 2, upon which a plate or lid 3 removably rests.

4 is an imperforate cover adapted to be passed through a slot 5 at one end of the box and to freely slide in a groove 6, extending around the inner surface of the box just above lid 3. Cover 4 may be held in various positions by means of a pivoted latch 7, adapted to engage any one of a series of notches 8 in the under side thereof.

9 is an upright partition dividing off a small portion of the interior of the box in which other plates or lids 10 and 11, adapted to replace lid 3, may be conveniently stored when not in use, the upper edge of partition 9 being recessed at 12, so that the lids 10 and 11 may be readily gripped when it is desired to remove them.

As clearly shown, the plate or lid 3 has therethrough a series of holes, 20 being a round hole, 21 a square hole, 22 a triangular hole, and so on, each hole differing in shape from every other hole. In Fig. 1 I have shown a series of blocks, 30 being a cylindrical block adapted to pass only through hole 20, 31 being a cubical block adapted to pass only through hole 21, and 32 being a block of triangular shape in end elevation, adapted to pass only through opening 22, and so on. Any desired number of each shape of block may be provided. Furthermore, the lid 3 may be replaced by other lids, such as 10 and 11, each lid having therein holes differing in shape from the holes in the others and blocks being provided corresponding in shape to the holes in each lid. In some instances I prefer to provide separate lids for each primary geometrical figure and its modifications. Thus one lid would have holes in the shape of a circle and its modifications, as the oval, ellipse, &c., and another would have holes in the shape of a square and its modifications, as the rectangle, rhomboid, &c. Blocks corresponding to the shape of the holes in each cover would of course be provided. Furthermore, for advanced scholars and for use when the box and blocks are used as a game apparatus a lid or lids may be provided, wherein the differences in the shapes of the holes are minute, requiring close scrutiny and an accurate eye to insert the proper block into its corresponding hole without making any ineffectual or misfit attempts.

This mind-training toy can be advantageously used to amuse and instruct children even before they can speak a word or at least after they have commenced to learn to talk. Place the box on the floor and draw back cover 4 and latch it in position to expose the round hole 20 in lid 3 and then give the child a few cylindrical blocks, such as 30. It soon learns to put the blocks in the holes. It is then given three sets of blocks similar to 30, 31, and 32, and cover 4 is pulled back and latched in position to expose the round, the square, and the triangular holes. At first the child will be quite sure to attempt to put the round block in the square hole and the square block in the round hole. Failing to do this it will eventually look at the block and at the hole and detecting the dissimilarity of the two images will make the first step in discriminating geometrical images. It will thereafter put the cylindrical block in the round hole and the cubical block in the square hole, and the method of the play or training is thereafter at the child's command. The lid 4 is then further withdrawn and the child given more blocks. When all of the holes of lid 3 have been learned, it is lifted from the shoulder 2 and lid 10 put in its place and other blocks given to the child. As many lids may of course be used as desired. By proper use of this toy a child's mind may be fully awakened as to its mathematical capacity, its attention trained, its will cultivated, its discrimination capacity augmented, its functional periodicity established, and its early mathematical memories associated with pleasurable emotional interests and play instincts. By five-minute lessons every day for six weeks a mind training may be given which will exert a profound influence for life not only upon the child's mathematical ability, but upon its mind as a whole. To effect this is the main object of the toy.

The arrangement of the holes in lid 3 and the relative disposition of said lid and of the cover 4 is preferably such that the holes of simplest form, such as the circle, equilateral triangle, and square, may be first exposed or opened, further opening of the cover exposing or opening holes of more complex form in the order of increased complexity.

The device may be used as a game apparatus by older children as well as by persons who have attained their majority, the object being to put all of the blocks in their holes without any misfit attempts or with a less number of such attempts than an opponent requires.

As will be apparent modifications may be made within wide limits without departing from the nature and principle of the invention. For example, the perforated plate or board may constitute the top of a table or be supported in any suitable manner. The blocks and holes may be of such relative size and shape that the blocks when inserted will be retained in the holes, and in this case the holes need not pass entirely through the plate.

What I claim is—

1. A toy or game apparatus consisting of a plate or board having therein a plurality of openings of different shapes, and a plurality of objects or blocks of different shapes corresponding to the shapes of and adapted to be inserted in the openings.

2. A toy or game apparatus consisting of a plate or board having therein a plurality of openings of different shapes and a plurality of objects or blocks of different shapes corresponding to the shapes of and adapted to be inserted in the openings, the shapes and sizes of the objects or blocks being such that each object or block can be inserted only in its corresponding opening.

3. A toy or game apparatus consisting of a plate or board having a plurality of holes therethrough of different shapes and a plurality of objects or blocks of different shapes corresponding to the shapes of and adapted to be passed through the holes.

4. A toy or game apparatus consisting of a plate or board having a plurality of holes therethrough of different shapes and a plurality of objects or blocks of different shapes corresponding to the shapes of and adapted to be passed through the holes, the shapes and sizes of the holes and of the objects or blocks being such that each object or block can be passed only through its corresponding hole.

5. A toy or game apparatus consisting of a plate or board forming part of a box or receptacle and having a plurality of holes of different geometrical shapes therethrough and a plurality of objects or blocks of different shapes corresponding to the shapes of and adapted to pass through the holes into the box.

6. A toy or game apparatus consisting of a plate or board forming part of a box or receptacle and having a plurality of holes of different shapes therethrough and a plurality of objects or blocks of different shapes corresponding to the shapes of and adapted to pass through the holes, the shapes and sizes of the holes and of the objects or blocks being such that each object or block can be passed only through its corresponding hole.

7. A toy or game apparatus consisting of a box, a plate or board constituting a lid for the box and having a plurality of holes therethrough of different shapes and a plurality of objects or blocks of different shapes corresponding to the shapes of and adapted to pass through the holes, the shapes and sizes of the holes and of the objects or blocks being such that each object or block can be passed only through its corresponding hole.

8. A toy or game apparatus consisting of a plate or board forming part of a box or closure and having a plurality of holes of different shapes therethrough, a cover movable to different positions to expose one or more of said holes, and a plurality of objects or blocks of different shapes corresponding to the shapes of and adapted to pass through the holes.

9. A toy or game apparatus consisting of a plate or board forming part of a box or closure and having a plurality of holes of different shapes therethrough, a cover movable to different positions to expose one or more of said holes, and a plurality of objects or blocks of different shapes corresponding to the shapes of and adapted to pass through the holes, the shapes and sizes of the holes and of the objects or blocks being such that each object or block can be passed only through its corresponding hole.

10. A toy or game apparatus consisting of a box or closure, a plate or board constituting a lid for the box and having a plurality of holes therethrough of different shapes, a cover movable to different positions to open one or more of the holes in the lid, and a plurality of objects or blocks of different shapes corresponding to and adapted to pass through the holes, the shapes and sizes of the holes and of the objects or blocks being such that each object or block can be passed only through its corresponding hole.

11. A toy or game apparatus consisting of a plate or board having a plurality of holes therethrough of different shapes, a plurality of objects or blocks of different shapes corresponding to the shapes of and adapted to pass through the holes in the plate or board, and a cover movable to different positions to expose or open one or more of the openings in the plate or board at the same time.

12. A toy or game apparatus consisting of a plate or board having a plurality of holes therethrough of different shapes, a plurality of objects or blocks of different shapes corresponding to the shapes of and adapted to pass through the holes in the plate or board, a cover movable to different positions to expose or open one or more of the openings in the plate or board at the same time, and a catch for holding the cover in its several positions.

13. A toy or game apparatus consisting of a plate or board having a plurality of holes therethrough of different shapes, a plurality of objects or blocks of different shapes corresponding to the shapes of and adapted to pass through the holes in the plate or board, and a cover movable to different positions to expose or open one or more of the openings in the plate or board at the same time, the relative arrangement of the holes and movement of the cover being such that holes of relatively simple shape are exposed or opened first and followed by holes of more complex shapes.

14. A toy or game apparatus consisting of a plate or board having a plurality of holes therethrough of different shapes and of relatively varying complexity of outline, a plurality of objects or blocks of different shapes corresponding to the shapes of the holes and each adapted to pass only through its corresponding hole, and a cover movable to different positions to expose or open one or more of the holes at the same time, the relative arrangement of the holes and movement of the cover being such that holes of relatively simple shape are exposed or opened first and followed by holes of more complex shapes.

15. A toy or game apparatus consisting of a plate or board forming part of a box or receptacle and having a plurality of holes therethrough of different shapes and of relatively varying complexity of outline, a plurality of objects or blocks of different shapes corresponding to the shapes of the holes and each adapted to pass only through its corresponding hole, and a cover movable to different positions to expose or open one or more of the holes at the same time, the relative arrangement of the holes and movement of the cover being such that holes of relatively simple shape are exposed or opened first and followed by more complex shapes.

16. A toy or game apparatus consisting of a plate or board forming part of a box or receptacle and having a plurality of different-shaped holes therethrough, a plurality of objects or blocks of different shapes corresponding to the shapes of the holes and each adapted to pass only through its corresponding hole, a cover movable to different positions to expose or open one or more holes at the same time, and a catch for holding the cover in its several positions.

In testimony whereof I have signed this specification in the presence of two subscribing witnesses.

ELMER GATES.

Witnesses:
REEVE LEWIS,
C. W. DRAPER.